UNITED STATES PATENT OFFICE.

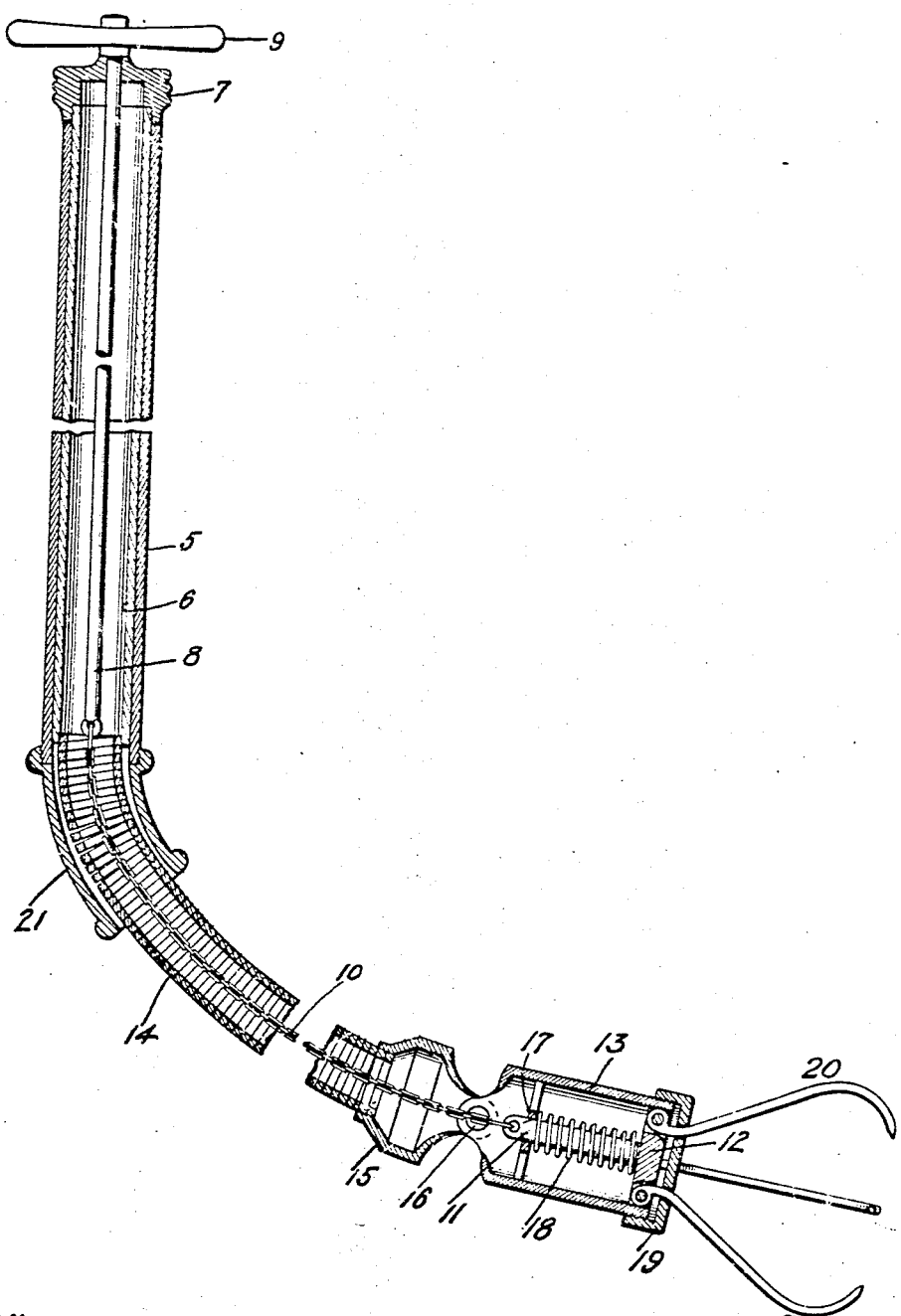

EMIL H. WEBER, OF LOUISVILLE, KENTUCKY.

PIPE-CLEANER.

963,965.  Specification of Letters Patent.  Patented July 12, 1910.

Application filed February 19, 1910. Serial No. 544,566.

*To all whom it may concern:*

Be it known that I, EMIL H. WEBER, a citizen of the United States, residing at Louisville, in the county of Jefferson and State of Kentucky, have invented certain new and useful Improvements in Pipe-Cleaners, of which the following is a specification.

This invention has reference to improvements in devices for removing obstructions from waste pipes and the like; and also for cleaning the same; the object of the invention being to provide a device of this kind which can be easily inserted into the pipe, and thereafter operated to remove the obstruction, and to clean the pipe; these operations being readily effected.

With these objects in view, the invention consists in a novel construction and arrangement of parts to be hereinafter described and claimed, reference being had to the accompanying drawing, in which a sectional view of the device is shown.

Referring to the drawing, 5 denotes the shank of the device, the same being a tube of suitable length. Within this tube is loosely mounted a tube 6 projecting from one end of the tube 5, and having fixed to its projecting end a knurled head 7. Within the bore of the tube 6 is mounted a rod 8 passing at one end loosely through a central opening in the head 7, and fitted on the outside thereof with a handle 9 of any suitable shape or form. To the other end of the rod is fastened one end of a chain or other suitable flexible connection 10 which is fastened at its other end to a stem 11 carried by a plunger 12 working in a small cylinder 13. To that end of the tube 6 opposite the end which carries the head 7 is made fast a piece of flexible tubing 14 of suitable length. This tubing carries at its outer end a hollow member 15 to which is pivotally connected, as indicated at 16, the cylinder 13, the latter being formed with ears which overlap ears on the hollow member, and through which ears the pivot passes. The chain 10 passes through the hollow member to the plunger stem 11.

In the bore of the cylinder 13 is a partition 17 through which the plunger stem 11 passes and by which it is guided. Between the partition and the plunger 12, a spring 18 is coiled around the plunger stem. That end of the cylinder opposite the end which is connected to the member 15, is closed by a screw cap 19 having openings through which pass loosely spring fingers 20 connected at one of their ends to the plunger 12. The fingers project divergingly from the cap, and have their extremities turned inwardly slightly.

It will be evident from the foregoing that when the plunger 12 is retracted, the spring fingers are drawn into the cylinder 13 along with the plunger, and at the same time they come together, and close around and grip any object which may be therebetween. The fingers open up to release the object when the plunger moves forwardly.

To that end of the tube 5 from which the flexible tubing 14 extends, is connected an elbow 21 which guides said tubing, and enables the device to be inserted well into the bend of the pipe to be operated on.

In operation, the device is inserted into the pipe until the fingers 20 reach the obstruction. A pull on the rod 8, by means of the handle 9, through the chain 10, retracts the plunger 12 whereupon the obstruction is gripped by the fingers 20 in the manner already described. The obstruction may then be removed from the pipe by removing the device therefrom, taking care to hold the plunger retracted. After the device has been removed from the pipe, the obstruction may be released by releasing the plunger, which is then advanced by the spring 18, whereupon the fingers spread and release the obstruction. The tubing 14 is sufficiently stiff to permit the plunger to be operated as stated. The wall of the pipe may also be cleaned or scraped by the fingers 20, they coming in contact with said wall when in open or spread position. This scraping action is effected by turning the group of fingers which is done by the rotating of the head 7. Inasmuch as the head is fast on the tube 6, the latter turns, and through the flexible tubing 14 rotates the member 15 and the cylinder 13, and through the latter a rotary movement is given the fingers.

The device herein described is simple in construction, and can be easily operated, and it effectually serves the purpose for which it is designed, the obstruction being quickly removed and the pipe thoroughly cleaned when the device is operated as described.

The device is strong and durable, and at the same time has sufficient flexibility to readily pass bends in the pipe.

I claim:

1. A device of the character described comprising a shank, a gripping device comprising spring fingers and a support therefor carried by the shank, said support including a cylinder closed at one end and having openings in said end, a plunger working in the cylinder, the fingers being fastened to the plunger and projecting divergingly therefrom through the openings in the closed end of the cylinder, and means for retracting the plunger.

2. A device of the character described comprising a tubular shank, a gripping device comprising spring fingers and a support therefor carried by the shank, said support including a cylinder open at one end and closed at its other end, there being openings in said closed end, a plunger working in the cylinder, the fingers being fastened to the plunger and projecting divergingly therefrom through the openings in the closed end of the cylinder, and means connected to the plunger for operating the same, said means entering the cylinder through its open end and passing through the tubular shank.

3. A device of the character described comprising a tubular shank, a tube mounted therein, and carrying a flexible tubing, a gripping device carried by the tubing, and operating means for the gripping device passing through the aforesaid tube and tubing.

4. A device of the character described comprising a tubular shank, a tube mounted therein, and carrying a flexible tubing, a hollow head carried by the tubing, a cylinder pivotally connected to the head, the pivoted end of the cylinder being open, and its opposite end closed, and said closed end having openings, a plunger working in the cylinder, spring fingers fastened to the plunger and projecting diverging therefrom through the openings in the closed end of the cylinder, and means connected to the plunger for retracting the same, said means passing through the tubing and the tube to which the latter is connected.

5. A device of the character described comprising a tubular shank, a tube mounted therein, and carrying a flexible tubing, a cylinder pivotally connected to the tubing, the pivoted end of the cylinder being open, and its opposite end closed, and said closed end having openings, a plunger working in the cylinder, spring fingers fastened to the plunger and projecting divergingly therefrom through the openings in the closed end of the cylinder, and means connected to the plunger for retracting the same, said means passing through the tubing and the tube to which the latter is connected.

6. A device of the character described comprising a tubular shank, a tube mounted therein, and carrying a flexible tubing, a gripping device carried by the tubing, operating means for the gripping device passing through the aforesaid tube and tubing, and means for rotating the tube to impart a rotary movement to the gripping device.

In testimony whereof I affix my signature in presence of two witnesses.

EMIL H. WEBER.

Witnesses:
FERN K. WOOTTON,
A. H. RICHARDSON.